United States Patent
Aikawa et al.

(10) Patent No.: US 8,873,915 B2
(45) Date of Patent: Oct. 28, 2014

(54) LOW-LOSS OPTICAL FIBER OVER WIDE WAVELENGTH RANGE AND METHOD OF MANUFACTURING THE SAME

(71) Applicant: Fujikura Ltd., Tokyo (JP)

(72) Inventors: Kazuhiko Aikawa, Sakura (JP);
Masahiro Asano, Sakura (JP);
Kazuyuki Hayashi, Sakura (JP);
Masami Miyachi, Sakura (JP); Manabu Kudoh, Sakura (JP)

(73) Assignee: Fujikura Ltd., Tokyo (JP)

( * ) Notice: Subject to any disclaimer, the term of this patent is extended or adjusted under 35 U.S.C. 154(b) by 13 days.

(21) Appl. No.: 13/890,749

(22) Filed: May 9, 2013

(65) Prior Publication Data
US 2013/0302001 A1 Nov. 14, 2013

(30) Foreign Application Priority Data
May 11, 2012 (JP) .................................. 2012-109990

(51) Int. Cl.
*G02B 6/02* (2006.01)
*C03B 37/012* (2006.01)

(52) U.S. Cl.
CPC ...... *G02B 6/02214* (2013.01); *C03B 37/01217* (2013.01); *C03B 2201/31* (2013.01); *C03B 2205/40* (2013.01); *C03B 2201/28* (2013.01); *C03B 2201/12* (2013.01); *C03B 2203/31* (2013.01); *C03B 37/01222* (2013.01); *C03B 37/0122* (2013.01); *C03B 37/01211* (2013.01); *C03B 2203/34* (2013.01); *C03B 2203/02* (2013.01); *C03B 2201/30* (2013.01); *C03B 2203/14* (2013.01); *C03B 2201/20* (2013.01); *C03B 2203/12* (2013.01); *C03B 2201/04* (2013.01); *C03B 2201/10* (2013.01); *C03B 2201/24* (2013.01)

USPC .............................. 385/123; 65/397

(58) Field of Classification Search
CPC ............ C03B 2201/12; C03B 2201/04; C03B 2201/08; C03B 2201/20; C03C 13/04; H01S 3/06716
USPC ............................. 385/123; 65/397
See application file for complete search history.

(56) References Cited

U.S. PATENT DOCUMENTS

| | | | |
|---|---|---|---|
| 5,891,210 A * | 4/1999 | Watanabe et al. | 65/406 |
| 6,608,955 B2 * | 8/2003 | Fukuda et al. | 385/125 |
| 6,944,380 B1 * | 9/2005 | Hideo et al. | 385/123 |
| 7,593,612 B2 * | 9/2009 | Shimotakahara | 385/128 |

FOREIGN PATENT DOCUMENTS

| | | |
|---|---|---|
| JP | 60-255646 A | 12/1985 |
| JP | 62-91608 U | 6/1987 |
| JP | 01-187506 A | 7/1989 |

OTHER PUBLICATIONS

Heraus Holding, "Speciality Fiber Preforms for the Most Demanding Applications", Heraeus Preforms, Jan. 2012, 2 pages.
Polymicro Technologies, LLC, "Silica/Silica Optical Fiber—FBP": http://www.polymicro.com/products/opticalfibers/products_opticalfibers_fbp.htm, Dec. 2004, 1 page.
Office Action issued by the Japanese Patent Office in Japanese Application No. 2012-109990 mailed Dec. 10, 2013.

* cited by examiner

*Primary Examiner* — Ellen Kim
(74) *Attorney, Agent, or Firm* — Sughrue Mion, PLLC

(57) ABSTRACT

A low-loss optical fiber over wide wavelength range includes a transmission loss of less than or equal to 40 dB/km in a whole wavelength range of 400-1400 nm, and being manufactured by drawing an optical fiber preform including a core composed of a silica glass having a hydroxyl-group concentration of less than or equal to 1 ppm and a cladding composed of a silica glass having a fluorine concentration of more than or equal to 3.2 wt %.

12 Claims, 4 Drawing Sheets

LOW-LOSS OPTICAL FIBER OVER WIDE WAVELENGTH RANGE AND METHOD OF MANUFACTURING THE SAME

CROSS REFERENCE TO RELATED APPLICATIONS

Priority is claimed on Japanese Patent Application No. 2012-109990, filed on May 11, 2012, the contents of which are incorporated herein by reference.

BACKGROUND OF THE INVENTION

1. Field of the Invention

The present invention relates to a low-loss optical fiber over wide wavelength range that has a low-loss in a broad range of wavelengths from a visible light region (400-750 nm) to a near-infrared light region (up to 1400 nm), and to a method of manufacturing the same.

2. Description of the Related Art

In an optical fiber having a low-loss at an ultraviolet region and a visible light region, high-OH silica glass doped with hydroxyl groups in high concentration is used as a constituent material of a core.

In addition, in an optical fiber used for wavelengths longer than a visible light region, in order to reduce an absorption loss (i.e., an absorption loss which occurs mainly at around the wavelength of 1.38 µm) caused by hydroxyl groups, low-OH silica glass in which a hydroxyl-group concentration is reduced is used as a constituent material of a core.

Attenuation characteristics of an optical fiber having a core composed of high-OH silica glass and of an optical fiber having a core composed of low-OH silica glass are shown in FIG. 5. Here, the hydroxyl-group concentration of the core composed of high-OH silica glass is approximately 1000 ppm, and the hydroxyl-group concentration of the core composed of low-OH silica glass is less than or equal to 1 ppm.

Fiber attenuation characteristics described in "Specialty Fiber Preforms for the Most Demanding Applications" by Heraeus Holding (hereinafter, referred to as Document 1) is shown in FIG. 6.

SSU/SBU, SOU, and SXU show lower attenuation at less than or equal to the wavelength of 500 nm; however, show higher attenuation at more than or equal to the wavelength of 700 nm due to the absorption loss of hydroxyl groups.

Regarding STU, STU-D, and SWU, the absorption loss of hydroxyl groups is relatively low, and low attenuation appears to be achieved in a near-infrared light region. However, at less than or equal to the wavelength of 500 nm, the line of the attenuation characteristics of SWU is rapidly away from the lines of the attenuation characteristics of SSU/SBU, SOU, and SXU, and the attenuation increases. In addition, at less than or equal to the wavelength of 500 nm, the lines of the attenuation characteristics of STU and STU-D are gradually away from the lines of the attenuation characteristics of SSU/SBU, SOU, and SXU, and the attenuation increases.

It is found from FIG. 6 that there are no optical fibers having attenuation of less than or equal to tens of dB/km near the wavelength of 1400 nm and attenuation of similar as SSU/SBU, SOU, and SXU at the wavelength of 400 nm.

Being applied to a broad range of wavelengths from a visible light region (400-750 nm) to a near-infrared light region (up to 1400 nm), a conventional optical fiber composed of low-OH silica glass has not been sufficiently practical since such optical fiber has a high transmission loss in a visible light region. On the other hand, being applied to a broad range of wavelengths from a visible light region (400-750 nm) to a near-infrared light region (up to 1400 nm), a conventional optical fiber composed of high-OH silica glass has not been sufficiently practical since such optical fiber has a high transmission loss in more than or equal to the wavelength of 700 nm.

Polymicro Technologies™ in the U.S., a manufacturer of specialty fibers, discloses lower loss optical fibers in a broad range of wavelengths (for example, Polymicro Technologies, LLC, "SILICA/SILICA Optical Fiber—FPB": http://www-.polymicro.com/products/opticalfibers/products_opticalfibers_fbp.htm, searched by Fujikura Ltd. on May 7, 2012, hereinafter, referred to as Document 2). Attenuation characteristics of an optical fiber over wide wavelength range disclosed in the above-described document is shown in FIG. 7.

However, even in these optical fibers, the loss at the wavelength of 1400 nm greatly increases due to the absorption loss of hydroxyl groups, and therefore, the loss further needs to be reduced.

SUMMARY OF THE INVENTION

The present invention is made in consideration of the above-mentioned circumstances, and provides a low-loss optical fiber over wide wavelength range that has a low-loss wide wavelength range from a visible light region (400-750 nm) to a near-infrared light region (up to 1400 nm), and a method of manufacturing the same.

A first aspect of the present invention is a low-loss optical fiber over wide wavelength range including a transmission loss of less than or equal to 40 dB/km in a whole wavelength range of 400-1400 nm, and being manufactured by drawing an optical fiber preform including a core composed of silica glass having a hydroxyl-group concentration of less than or equal to 1 ppm and a cladding composed of silica glass having a fluorine concentration of more than or equal to 3.2 wt %.

In a second aspect of the present invention, in the above-described first aspect, the fluorine concentration is preferably less than or equal to 7.2 wt %.

In a third aspect of the present invention, in the above-described first or the second aspect, it is preferable that a transmission loss at a wavelength of 400 nm is less than or equal to 40 dB/km, a transmission loss at a wavelength of 1300 nm is less than or equal to 10 dB/km, and a maximum transmission loss in wavelengths of 1300-1400 nm is less than or equal to 40 dB/km.

In a forth aspect of the present invention, in the above-described first aspect, it is preferable that the optical fiber preform is composed by integrating a core preform which forms the core with a cladding preform which forms the cladding and is composed on an inner surface of a silica glass tube, and the optical fiber preform is drawn at a drawing speed of less than or equal to 10 m/min.

In a fifth aspect of the present invention, in the above-described first aspect, it is preferable that the optical fiber preform is composed by integrating a core preform which forms the core with a cladding preform which forms the cladding and is composed on an inner surface of a silica glass tube, and the optical fiber preform is drawn by the drawing speed of less than or equal to 10 m/min, and a transmission loss at a wavelength of 1300 nm is less than or equal to 10 dB/km, and a maximum transmission loss in wavelengths of 1300-1400 nm is less than or equal to 40 dB/km.

In a sixth aspect of the present invention, in the above-described forth or the fifth aspect, the drawing speed is preferably less than or equal to 5 m/min.

In a seventh aspect of the present invention, in the above-described first aspect, a fluorine concentration of the core is preferably 0.8-1.6 wt %.

An eighth aspect of the present invention is a method of manufacturing a low-loss optical fiber over wide wavelength range including, fabricating a core preform composed of silica glass having a hydroxyl-group concentration of less than or equal to 1 ppm, fabricating a cladding preform on an inner surface of a silica glass tube, the cladding being composed of silica glass having a fluorine concentration of more than or equal to 3.2 wt %, grinding a surface of the core preform and an inner surface of the cladding preform by etching, fabricating an optical fiber preform by integrating the core preform with the cladding preform, drawing the optical fiber preform at a drawing speed of less than or equal to 10 m/min, and manufacturing a low-loss optical fiber over wide wavelength range comprising a transmission loss of less than or equal to 40 dB/km in a whole wavelength range of 400-1400 nm and a transmission loss of less than or equal to 10 dB/km at a wavelength of 1300 nm.

In a ninth aspect of the present invention, in the above-described eighth aspect, a maximum transmission loss is less than or equal to 40 dB/km in a wavelength range of 1300-1400 nm.

In a tenth aspect of the present invention, in the above-described eighth aspect, the drawing speed is less than or equal to 5 m/min.

According to the present invention, a low-loss optical fiber over wide wavelength range which shows excellent optical characteristics, in which a hydroxyl-group concentration in a core is reduced, and thus, the transmission loss is less than or equal to 40 dB/km in a whole range of wavelengths from a visible light region (400-750 nm) to a near-infrared light region (up to 1400 nm), can be provided.

DETAILED DESCRIPTION OF THE PREFERRED EMBODIMENTS

Figure 1:
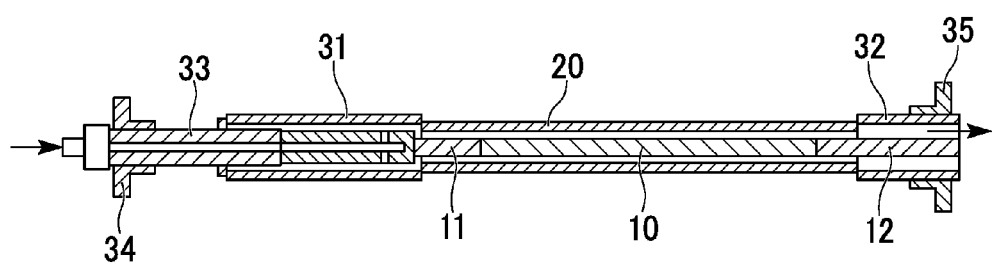
FIG. 1 is a cross-sectional schematic diagram showing integrating a core preform with a cladding preform.

The preferred embodiments of a low-loss optical fiber over wide wavelength range and a method of manufacturing the same of the present invention are described.

Note that the present preferred embodiments are explained more concretely to ensure the better understanding of the present invention, and do not limit the present invention unless otherwise indicated.

A low-loss optical fiber over wide wavelength range of the present preferred embodiment is a low-loss optical fiber over wide wavelength range including a transmission loss of less than or equal to 40 dB/km in a whole wavelength range of 400-1400 nm, and being manufactured by drawing an optical fiber preform including a core composed of silica glass having a hydroxyl-group concentration of less than or equal to 1 ppm and a cladding composed of silica glass having a fluorine concentration of more than or equal to 3.2 wt %.

The low-loss optical fiber over wide wavelength range of the present preferred embodiments is mainly for use in a spectroscopic analysis.

Numerical aperture (NA) of an optical fiber for use in a spectroscopic analysis is preferably more than or equal to 0.18, and since the standard is 0.22, a relative refractive index difference between the core and the cladding needs to be more than or equal to 0.8%. This is because that compared to an optical fiber for use in communication, a greater relative refractive index difference between the core and the cladding is necessary. An optical fiber preform having such structure of the core and the cladding is fabricated by a fabrication method which reduces defects generation. By drawing the fabricated optical fiber preform, an optical fiber that has a low-loss over wide wavelength range from a visible light region (400-750 nm) to a near-infrared light region (up to 1400 nm) is obtained.

In order to obtain a low-loss optical fiber over wide wavelength range from a visible light region (400-750 nm) to a near-infrared light region (up to 1400 nm), it is effective to reduce defects in silica glass composing an optical fiber. Reducing defects in silica glass has been considered from more than 20 years ago in a field where radiation-resistant characteristics need to be improved. For example, in Japanese Unexamined Utility Model Application, First Publication No. S62-91608, it is disclosed that "a radiation-resistant optical fiber including a core composed of silica glass having hydroxyl-groups of more than or equal to 100 ppm and a cladding layer composed of silica glass having boron and fluorine provided on an outer surface of the core". In this optical fiber, although radiation-resistant characteristics improve, the transmission loss at an ultraviolet region is reduced.

As for structural defects of silica glass that influence a loss in an ultraviolet region, there are for example, a peroxy linkage (POL, $\equiv$Si—O—O—Si$\equiv$) which has a broad absorption band at a wavelength range of 160-180 nm, an oxygen deficient center (ODC, $\equiv$Si—Si$\equiv$) which has an absorption band at a wavelength of 163 nm, a non-bridging oxygen hole center (NBOHC, $\equiv$Si—O.) which has absorption bands at wavelengths of 260 nm and 180 nm, and an E' center ($\equiv$Si.) which has an absorption band at wavelength of 220 nm.

Note that "$\equiv$" described above represents bonds of one Si atom and three O atoms.

When hydrogen is contained in synthesized silica glass, the NBOHC and the E' center are reconstructed as $\equiv$SiOH and $\equiv$SiH which do not have an absorption peak at an ultraviolet region of wavelengths of 180-260 nm.

As described above, in a wavelength range such as an ultraviolet region, it is effective to add such as silica glass having less defects or materials which fill in defects spontaneously. However, in an optical fiber composed of silica glass to which a hydroxyl-group is purposely added, a loss where an absorption peak is 1.38 μm exists as described above, and the loss increases at wavelengths longer than wavelengths of a visible light.

On the other hand, since an optical fiber for use in communication is used at a wavelength band of 1.31 μm, 1.55 μm and so on, it is necessary to reduce an absorption loss of a hydroxyl-group having an absorption peak at 1.38 μm as much as possible. However, soot composed by using an oxyhydrogen flame includes a lot of hydroxyl groups.

Therefore, in silica glass fabricated by a vapor phase axial deposition (VAD) method, during a process of sintering the glass that processes soot under a high temperature, hydroxyl groups are removed by a dehydration gas. However, the silica glass obtained by a dehydration process has defects due to a lack of oxygen. Therefore, an optical fiber using such silica glass as a core material has a low transmission loss at a wavelength band of 1.31 μm, 1.55 μm and so on. However, at a visible light region (400-750 nm), the optical fiber using such silica glass tends to have a high transmission loss compared to an optical fiber using a core to which a hydroxyl-group is purposely added.

In view of above, in the present preferred embodiment, a method for reducing a hydroxyl-group concentration and obtaining an optical fiber preform composed of silica glass having less structural defects is provided.

Even though silica glass having a low hydroxyl-group concentration and less structural defects is used, when an outside vapor-deposition method is used in forming a cladding which is necessary to guide the light in the core, defects are generated in silica glass of the core. This results in the transmission loss. In the present preferred embodiment, a method of reducing the generation of the defects in silica glass which constitute the core and obtaining, for example, a necessary refractive index and a core to cladding ratio.

Furthermore, according to the present preferred embodiment, even when drawing an optical fiber, an optical fiber having a low transmission loss can be obtained by reducing the generation of the defects in silica glass which constitute the core.

In the present preferred embodiment, the silica glass is glass which includes silica as a main component that substantially does not contain alkali metal ions, may be pure silica ($SiO_2$) glass, and may be pure silica glass doped with an additive other than an alkali metal such as fluorine (F) and germanium dioxide ($GeO_2$).

The fluorine concentration of a cladding is determined in accordance with a relative refractive index difference between a core and the cladding. The numerical aperture (NA) is resulted from the relative refractive index difference between the core and the cladding based on formulae (1) and (2) shown below.

$$\Delta \cong \frac{n_1^2 - n_2^2}{2n_1^2} \cong \frac{n_1 - n_2}{n_1} \quad (1)$$

$$NA = n_1\sqrt{2\Delta} \quad (2)$$

In formulae (1) and (2), $n_1$ represents a refractive index of the core, $n_2$ represents a refractive index of the cladding, $\Delta$ represents a relative refractive index difference between the core and the cladding, and NA represents a numerical aperture.

The low-loss optical fiber over wide wavelength range of the present preferred embodiments has the relative refractive index difference between the core and the cladding of 0.8-1.8% and the numerical aperture (NA) of 0.18-0.28.

When the relative refractive index difference between the core and the cladding is less than 0.8%, the numerical aperture of the optical fiber is less than 0.18. Therefore, the optical fiber does not sufficiently guide light and is not desirable for an optical fiber for use in a spectroscopic analysis. On the other hand, when the core is composed of pure silica, the relative refractive index difference between the core and the cladding is over 1.8%. It is not preferable because bobbles are generated during a process of drawing an optical fiber.

<Method of Fabricating Optical Fiber Preform>

Hereinafter, a method of fabricating an optical fiber preform is described.

Process of Fabricating Core Preform

In a process of fabricating a core preform, a core preform that forms a core and is composed of silica glass having a hydroxyl-group concentration of less than or equal to 1 ppm is fabricated.

The method of fabricating a core preform is not particularly limited, and any known method can be used. As the method, a flame hydrolysis method such as a VAD method is preferable. More specifically, by a flame hydrolysis method such as a VAD method, silica glass particles are deposited on a tip of a starting rod to fabricate soot. The soot is heated at a temperature which can maintain forms of the silica glass particles (for example, approximately 900-1100° C.) under atmosphere of a dehydration gas (for example, a halogen gas, particularly a chlorine gas) to perform a dehydration (anhydrous) process. Next, it is preferable for the dehydration-processed soot to be sintering-processed by heating (for example, 1500-1600° C.) under the atmosphere of an inert gas (for example, a helium gas) to be sintered.

In order to measure the hydroxyl-group concentration of the core preform, a portion of the core preform is cut and the hydroxyl-group concentration at a cross-section thereof is measured by Fourier Transform Infrared Spectroscopy (FT-IR).

When the hydroxyl-group concentration of the core preform is over 1 ppm, the transmission loss at the wavelength of 1380 nm greatly increases. In addition, even if a layer including a lot of hydroxyl groups remain on the surface of the core preform during the fabricating process, the transmission loss at the wavelength of 1380 nm similarly increases. Since the increase of the transmission loss occurs mainly at around the wavelength of 1380 nm, it also leads to an increase of the transmission loss at the wavelength of 1400 nm.

Furthermore, fluoride may be added to the core preform by performing the above-described sintering process of the soot under atmosphere of an inert gas including silicon tetrafluoride ($SiF_4$).

The fluorine concentration of the core preform is preferably 0.8-1.6 wt %.

By adding fluorine to the core preform with the additive amount described above, an optical fiber obtained by drawing the optical fiber preform using the core preform is hard to deteriorate by ultraviolet light.

Process of Fabricating Cladding Preform

In a process of fabricating a cladding preform, a cladding preform composed of silica glass which forms a cladding and has a fluorine concentration of more than or equal to 3.2 wt % is fabricated The method of fabricating a cladding preform is not particularly limited, and any known method can be used. As the method, a plasma chemical vapor deposition (PCVD) method is preferable. More specifically, by a PCVD method, silicon tetrachloride ($SiCl_4$), tetrafluoroethylene ($C_2F_4$), and oxygen ($O_2$) are supplied to the inside of the silica glass tube to generate a plasma flame inside the silica glass tube. After fabricating soot by depositing glass particles on the inner surface of the silica glass tube by the heat, it is preferable to heat the silica glass tube to be directly sintered.

A fluorine concentration measurement of the cladding preform is performed by measuring a refractive index profile with a preform analyzer to be determined from the measurement values.

In the present preferred embodiment, the fluorine concentration of the cladding preform is preferably more than or equal to 3.2 wt %, and more preferably, more than or equal to 3.2 wt % and less than or equal to 7.2 wt %.

When the fluorine concentration of the cladding preform is less than 3.2 wt %, since it is not possible to increase the relative refractive index difference between the core and the cladding, is not desirable for an optical fiber for use in a spectroscopic analysis. On the other hand, when the fluorine concentration of the cladding preform is over 7.2 wt %, it is not preferable because bobbles are generated during a process of drawing an optical fiber.

Process of Integrating Core Preform with Cladding Preform

The core preform and the cladding preform obtained as described above are integrated by a jacket method.

Particularly, as shown in FIG. 1, the core preform 10, each end of which is connected to dummy members 11, 12, is inserted into a silica glass tube 20 where the cladding preform is composed on an inner surface thereof.

A cylindrical-shaped shielding member 31 is connected to one end of the silica glass tube 20 (i.e., in the core preform 10, a side that the dummy member 11 is connected) and a cylindrical-shaped shielding member 32 is connected to the other end of the silica glass tube 20 (i.e., in the core preform 10, a side that the dummy member 12 is connected), and thereby, the inside of the silica glass tube 20 is shielded from outside air.

The holding member 33 is inserted into the shielding member 31 from a side of the shielding member 31 that is not connected to the silica glass tube 20, and thereby, the dummy member 11 is held by the holding member 33.

The holding member 33 is fixed by a chuck 34 and the shielding member 32 is fixed by a chuck 35.

From the side of the holding member 33, dehydration gas such as helium (He), oxygen ($O_2$), or chlorine ($Cl_2$) is supplied to the inside of the silica glass tube 20. Then, through etching, a surface of the core preform 10 and an inner surface of the cladding preform composed on an inner surface of the silica glass tube 20 are etched.

The inside of the silica glass tube 20 is depressurized and the silica glass tube 20 to which the core preform 10 is inserted is heated, and thereby, the core preform 10 and the cladding preform composed on the inner surface of the silica glass tube 20 are integrated.

The temperature of heating the silica glass tube 20 into which the core preform 10 is inserted is preferably 1700-1900° C.

Next, the silica glass tube 20 is removed by flame polishing, and the optical fiber preform is obtained.

In the obtained optical fiber preform described above, the hydroxyl-group concentration of silica glass which forms the core is less than or equal to 1 ppm, the fluorine concentration of silica glass which forms the cladding is more than or equal to 3.2 wt %, the relative refractive index difference between the core and the cladding is 0.8-1.8%, the numerical aperture (NA) is 0.18-0.28, and an outer diameter of the cladding is more than or equal to 1.1 times with respect to a core diameter.

<Method of Manufacturing Optical Fiber>

A method of drawing the optical fiber preform fabricated by the methods described above is not particularly limited, and any known method can be used.

When drawing the optical fiber preform, the drawing speed is preferably less than or equal to 10 m/min, and more preferably less than or equal to 5 m/min. When the drawing speed is over 10 m/min, in a whole range of wavelengths from 400 nm to 1400 nm, an optical fiber having the transmission loss of less than or equal to 40 dB/km sometimes cannot be obtained. Particularly, the loss increases at a short wavelength range.

The optical fiber after the drawing is preferably covered with various resins such as ultraviolet curing acrylate or polyimide by known methods.

In a low-loss optical fiber over wide wavelength range of the present invention, the hydroxyl-group concentration of the core is reduced and in a whole range of wavelengths from a visible light region (400-750 nm) to a near-infrared light region (up to 1400 nm), the transmission loss is less than or equal to 40 dB/km, which is a remarkable optical characteristic. Therefore, a low-loss over wide wavelength range optical fiber of the present preferred embodiment is preferable for an optical fiber for use in a spectroscopic analysis.

According to the method of manufacturing the low-loss optical fiber over wide wavelength range of the present preferred embodiments, when the hydroxyl-group concentration of silica glass which forms a core is less than or equal to 1 ppm and the fluorine concentration of silica glass which forms a cladding is more than or equal to 3.2 wt %, manufacturing an optical fiber preform is easy and manufacturing process thereof is simple. Therefore, in a whole range of wavelengths from a visible light region (400-750 nm) to a near-infrared light region (up to 1400 nm), a low-loss optical fiber over wide wavelength range having the transmission loss of less than or equal to 40 dB/km can be provided at a low cost.

EXAMPLES

Hereinafter, the present invention is described more specifically by Examples and Comparative Examples; however, the present invention is not limited to the Examples described below.

Example 1

By a VAD method, silica glass particles are deposited on a tip of a starting rod to fabricate soot. The fabricated soot is dehydrated (dried) by heating at 1000° C. under a chlorine gas atmosphere and the dehydrated soot is sintered by heating at 1550° C. under a helium gas atmosphere, and thereby, a transparent preform is obtained. Thus, the core preform composed of silica glass having the hydroxyl-group concentration of less than or equal to 1 ppm is fabricated.

Furthermore, by a PCVD method, silicon tetrachloride ($SiCl_4$), tetrafluoroethylene ($C_2F_4$), and oxygen ($O_2$) are supplied to the inside of the silica glass tube to generate a plasma flame inside the silica glass tube. Glass particles are deposited on the inner surface of the silica glass tube by the heat to be directly sintered. Thus, the cladding preform composed of the silica glass having the fluorine concentration of 3.6 wt % is fabricated in the silica glass tube.

Next, as shown in FIG. 1, the core preform, each end of which is connected to a dummy member, is inserted into a silica glass tube where the cladding preform is composed on an inner surface thereof, and the inside of the silica glass tube is shielded from outside air. In the silica glass tube, chlorine ($Cl_2$) is supplied as the dehydration gas, and the surface of the core preform and the inner surface of the cladding preform composed on an inner surface of the silica glass tube are etched through an etching method.

The inside of the silica glass tube is depressurized and the silica glass tube into which the core preform is inserted is heated at 1800° C., and thereby, the core preform and the cladding preform are integrated.

A portion of the surface of the integrated preform is removed by flame polishing, and the optical fiber preform is obtained.

The obtained optical fiber preform has the relative refractive index difference between the core and the cladding of 0.9%, and an outer diameter of the cladding is 1.42 times with respect to the core diameter.

The obtained optical fiber preform is drawn at the drawing speed of 5 m/min, and the optical fiber of Example 1 that has a core diameter of 120 μm, a cladding diameter of 170 μm, and a coating diameter of 190 μm is obtained.

The transmission loss of the obtained optical fiber is measured in a wavelength range of 400-1450 nm. At the wavelength of 400 nm, the transmission loss is 36 dB/km, at the wavelength of 1300 nm, the transmission loss is 2.0 dB/km, at the wavelength of 1380 nm which is a peak wavelength of a hydroxyl-group absorption loss, the transmission loss is 11 dB/km, and the numerical aperture (NA) is 0.20. The transmission loss of the optical fiber is measured by a generally-used cutback method.

Figure 2:
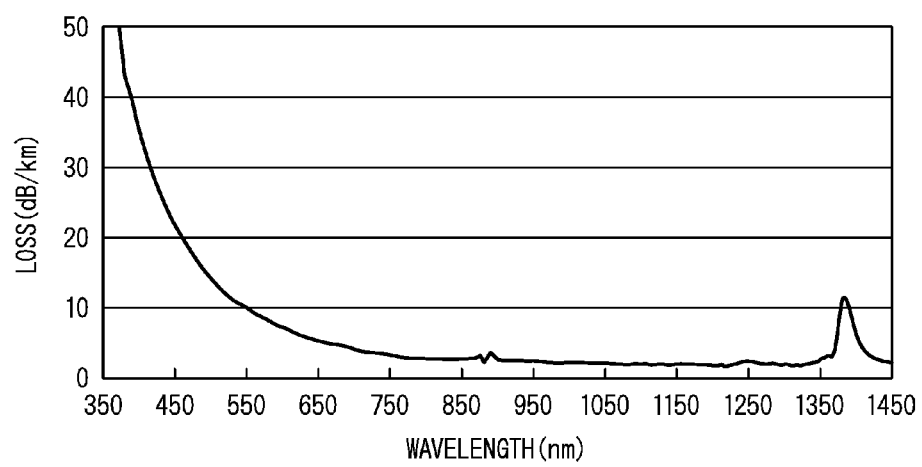
FIG. 2 is a graph showing attenuation characteristics of an optical fiber in Examples 1 and 2.

The main characteristics of the optical fiber of Example 1 are shown in Table 1. In addition, attenuation characteristics of the optical fiber of Example 1 are shown in FIG. 2.

Example 2

By a VAD method, silica glass particles are deposited on a tip of a starting rod to fabricate soot. The fabricated soot is dehydrated (dried) by heating at 1000° C. under an atmosphere of a chlorine gas and the dehydrated soot is sintered by heating at 1550° C. under a helium gas atmosphere, and thereby, a transparent vitric preform is obtained. Thus, the core preform composed of a silica glass having the hydroxyl-group concentration of less than or equal to 1 ppm is fabricated.

Furthermore, by a PCVD method, silicon tetrachloride ($SiCl_4$), tetrafluoroethylene ($C_2F_4$), and oxygen ($O_2$) are supplied to the inside of the silica glass tube to generate a plasma flame inside the silica glass tube. Glass particles are deposited on the inner surface of the silica glass tube by the heat to be directly. Thus, the cladding preform composed of the silica glass having the fluorine concentration of 5.0 wt % is fabricated in the silica glass tube.

The above-described core preform and the cladding preform are integrated in the same manner as described in Example 1.

A portion of the surface of the integrated preform is removed by flame polishing, and the optical fiber preform is obtained.

The obtained optical fiber preform has the relative refractive index difference between the core and the cladding of 1.25%, and an outer diameter of the cladding is 1.42 times with respect to the core diameter. The obtained optical fiber preform is drawn at the drawing speed of 5 m/min, and the optical fiber of Example 2 that has a core diameter of 120 μm, a cladding diameter of 170 μm, and a coating diameter of 190 μm is obtained.

The transmission loss of the obtained optical fiber is measured in a wavelength range of 400-1400 nm in the same manner as described in Example 1. At the wavelength of 400 nm, the transmission loss is 36 dB/km, at the wavelength of 1300 nm, the transmission loss is 2.0 dB/km, at the wavelength of 1380 nm, the transmission loss is 11 dB/km, and the numerical aperture (NA) is 0.22.

The main characteristics of the optical fiber of Example 2 are shown in Table 1. In addition, attenuation characteristics of the optical fiber of Example 2 are shown in FIG. 2.

Comparative Example 1

By a direct method, the silica glass having a hydroxyl-group concentration of 1000 ppm is fabricated.

The fabricated silica glass is used as a core preform, by a plasma outside vapor-deposition method, silicon tetrachloride ($SiCl_4$) gas and sulfur hexafluoride ($SF_6$) are supplied to plasma to deposit glass particles on an outer surface of the core preform and to be directly sintered. Thus, the optical fiber preform including a core having the hydroxyl-group concentration of 1000 ppm and a cladding having the fluorine concentration of 5.0 wt % is obtained.

The obtained optical fiber preform has the relative refractive index difference between the core and the cladding of 1.25%, and an outer diameter of the cladding is 1.42 times with respect to the core diameter.

The above-described optical fiber preform is drawn at the drawing speed of 10 m/min, and the optical fiber of Comparative Example 1 that has a core diameter of 120 μm, a cladding diameter of 170 μm, and a coating diameter of 190 μm is obtained.

Similar to Example 1, the transmission loss of the obtained optical fiber is measured in a wavelength range of 400-1400 nm. At the wavelength of 400 nm, the transmission loss is 40 dB/km, at the wavelength of 1300 nm, the transmission loss is more than or equal to 1000 dB/km, and the numerical aperture (NA) is 0.22. Also, it is seen that an optical fiber having a particularly high transmission loss is obtained.

The main characteristics of the optical fiber of Comparative Example 1 are shown in Table 1.

Comparative Example 2

By a VAD method, silica glass particles are deposited on a tip of a starting rod to fabricate soot. The fabricated soot is dehydrated (dried) by heating at 1000° C. under the atmosphere of a chlorine gas and the dehydrated soot is sintered by heating at 1550° C. under an atmosphere of a helium gas, and thereby, a transparent vitric preform is obtained. Thus, silica glass having the hydroxyl-group concentration of less than or equal to 1 ppm is fabricated.

The fabricated silica glass is used as a core preform, by a plasma outside vapor-deposition method, silicon tetrachloride ($SiCl_4$) gas and sulfur hexafluoride ($SF_6$) are supplied to plasma to deposit glass particles on an outer surface of the core preform and to be directly sintered. Thus, the optical fiber preform including a core having the hydroxyl-group concentration of less than or equal to 1 ppm and a cladding having a fluorine concentration of 5.0 wt % is obtained.

The obtained optical fiber preform has a relative refractive index difference between the core and the cladding of 1.25%, and an outer diameter of the cladding is 1.42 times with respect to the core diameter.

The fabricated optical fiber preform is drawn at a drawing speed of 10 m/min, and the optical fiber of Comparative Example 2 that has a core diameter of 120 μm, a cladding diameter of 170 μm, and a coating diameter of 190 μm is obtained.

Similar to Example 1, the transmission loss of the obtained optical fiber is measured in a wavelength range of 400-1400 nm. At the wavelength of 400 nm, the transmission loss is 170 dB/km, at the wavelength of 1300 nm, the transmission loss is 2.0 dB/km, at the wavelength of 1380 nm, the transmission loss is 10 dB/km, and the numerical aperture (NA) is 0.22. And it is seen that an optical fiber having a particularly high transmission loss is obtained.

The main characteristics of the optical fiber of Comparative Example 2 are shown in Table 1.

Example 3

Similar to Example 1, an optical fiber preform is fabricated.

The fabricated optical fiber preform is drawn at the drawing speed of 10 m/min, and the optical fiber of Example 3 that has a core diameter of 120 μm, a cladding diameter of 170 μm, and a coating diameter of 190 μm is obtained.

Similar to Example 1, the transmission loss of the obtained optical fiber is measured in a wavelength range of 400-1400 nm. At the wavelength of 400 nm, the transmission loss is 38 dB/km, at the wavelength of 1300 nm, the transmission loss is 1.8 dB/km, at the wavelength of 1380 nm, the transmission loss is 9 dB/km, and the numerical aperture (NA) is 0.22.

The main characteristics of the optical fiber of Example 3 are shown in Table 1.

Comparative Example 3

Similar to Example 1, an optical fiber preform is fabricated.

The fabricated optical fiber preform is drawn at the drawing speed of 20 m/min, and the optical fiber of Comparative Example 3 that has a core diameter of 120 μm, a cladding diameter of 170 μm, and a coating diameter of 190 μm is obtained.

Similar to Example 1, the transmission loss of the obtained optical fiber is measured in a wavelength range of 400-1400 nm. At the wavelength of 400 nm, the transmission loss is 44 dB/km, at the wavelength of 1300 nm, the transmission loss is 1.5 dB/km, at the wavelength of 1380 nm, the transmission loss is 7 dB/km, and the numerical aperture (NA) is 0.22.

The main characteristics of the optical fiber of Comparative Example 3 are shown in Table 1. Regarding the optical fiber of Comparative Example 3, the transmission loss at the wavelength of 400 nm is high; therefore, the optical fiber did not have sufficient performance for use in a spectroscopic analysis.

TABLE 1

| | Example 1 | Example 2 | Example 3 | Comparative Example 1 | Comparative Example 2 | Comparative Example 3 |
|---|---|---|---|---|---|---|
| Method of fabricating core preform | VAD method | VAD method | VAD method | Direct method | VAD method | VAD method |
| Hydroxyl-group concentration of core preform [ppm] | ≤1 | ≤1 | ≤1 | 1000 | ≤1 | ≤1 |
| Fluorine concentration of cladding [wt %] | 3.6 | 5.0 | 5.0 | 5.0 | 5.0 | 5.0 |
| Refractive index difference of cladding with respect to pure silica glass [%] | 0.9 | 1.25 | 1.25 | 1.25 | 1.25 | 1.25 |
| Refractive index difference between core and cladding [%] | 0.9 | 1.25 | 0.9 | 1.25 | 1.25 | 0.9 |
| Method of integrating core and cladding | Jacket method | Jacket method | Jacket method | Plasma outside vapor-deposition method | Plasma outside vapor-deposition method | Jacket method |
| Core diameter [μm] | 120 | 120 | 120 | 120 | 120 | 120 |
| Cladding diameter [μm] | 170 | 170 | 170 | 170 | 170 | 170 |
| Drawing speed [m/min] | 5 | 5 | 10 | 10 | 10 | 20 |
| Transmission loss at wavelength of 400 nm [dB/km] | 36 | 36 | 38 | 40 | 170 | 44 |
| Transmission loss at wavelength of 1300 nm [dB/km] | 2.0 | 2.0 | 1.8 | ≥1000 | 2.0 | 1.5 |
| Transmission loss at wavelength of 1380 nm [dB/km] | 11 | 11 | 9 | ≥1000 | 10 | 7 |

TABLE 1-continued

|  | Example 1 | Example 2 | Example 3 | Comparative Example 1 | Comparative Example 2 | Comparative Example 3 |
|---|---|---|---|---|---|---|
| NA at wavelength of 630 nm (numerical aperture) | 0.20 | 0.22 | 0.22 | 0.22 | 0.22 | 0.22 |

Example 4

A deterioration test of the optical fiber of Example 1 is performed by irradiating ultraviolet light in the optical fiber of Example 1 using an excimer laser.

The ultraviolet irradiation conditions are the irradiation wavelength of 193 nm (ArF), the irradiation energy of 5 mJ/cm$^2$, number of cycles of 100 pps, and pulse numbers of 10$^5$ pulses.

Figure 3:
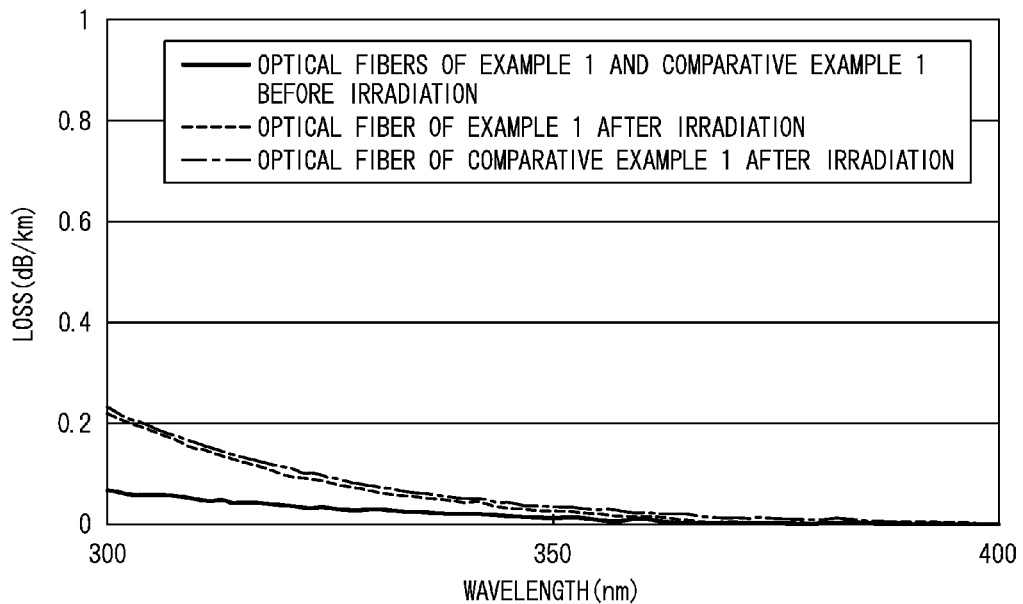
FIG. 3 is a graph showing attenuation characteristics of an optical fiber in Example 1 and an optical fiber in Comparative Example 1 before and after irradiating ultraviolet light by an excimer laser.

Before and after irradiating the ultraviolet light, the transmission loss of the optical fiber of Example 1 is measured in a wavelength range of 300-400 nm. Attenuation characteristics of the optical fiber of Example 1 are shown in FIG. 3.

Comparative Example 4

Similar to Example 4, a deterioration test of the optical fiber of Comparative Example 1 is performed by irradiating ultraviolet light in the optical fiber of Comparative Example 1 using an excimer laser.

Before and after irradiating the ultraviolet light, the transmission loss of the optical fiber of Comparative Example 1 is measured in a wavelength range of 300-400 nm. Attenuation characteristics of the optical fiber of Comparative Example 1 are shown in FIG. 3.

From the results shown in FIG. 3, it is confirmed that the deterioration, which is due to the loss before and after irradiating the ultraviolet light, of the optical fiber of Example 1 and the optical fiber of Comparative Example 1 are approximately the same and remarkably small.

In addition, in FIG. 3, the attenuation characteristics of the optical fiber of Example 1 and the optical fiber of Comparative Example 1 before irradiating the ultraviolet light are approximately the same on a scale of FIG. 3. Therefore, the attenuation characteristics of the optical fiber of Example 1 and the optical fiber of Comparative Example 1 are shown in a single line.

Example 5

A deterioration test of the optical fiber of Example 1 is performed by irradiating ultraviolet light in the optical fiber of Example 1 using a deuterium lamp.

The deuterium lamp used for the deterioration test is a water-cooled deuterium lamp of 150 W (L1835 lamp, wavelengths of 115-400 nm manufactured by Hamamatsu Photonics K.K.). With the deuterium lamp, the ultraviolet light is irradiated into the optical fiber for 12 hours.

Figure 4:
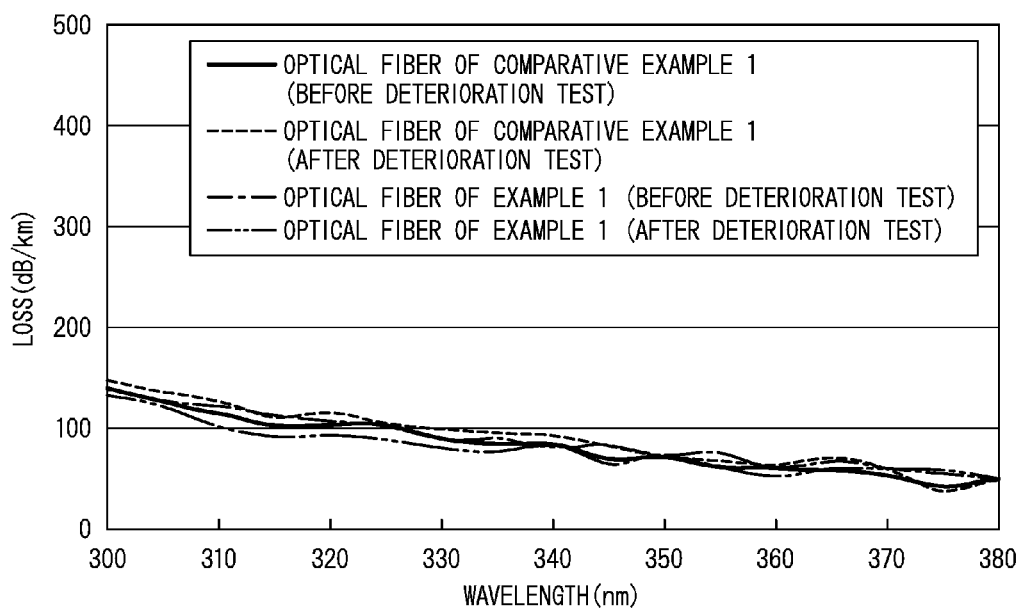
FIG. 4 is a graph showing attenuation characteristics of an optical fiber in Example 1 and an optical fiber in Comparative Example 1 before and after irradiating ultraviolet light by a deuterium lamp.
Figure 5:
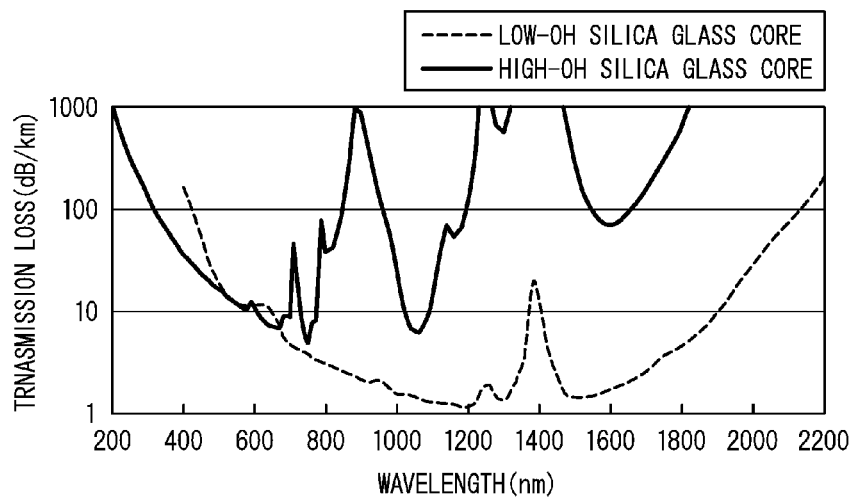
FIG. 5 is a graph showing attenuation characteristics of an optical fiber having a core composed of high-OH silica glass and an optical fiber having a core composed of low-OH silica glass.
Figure 6:
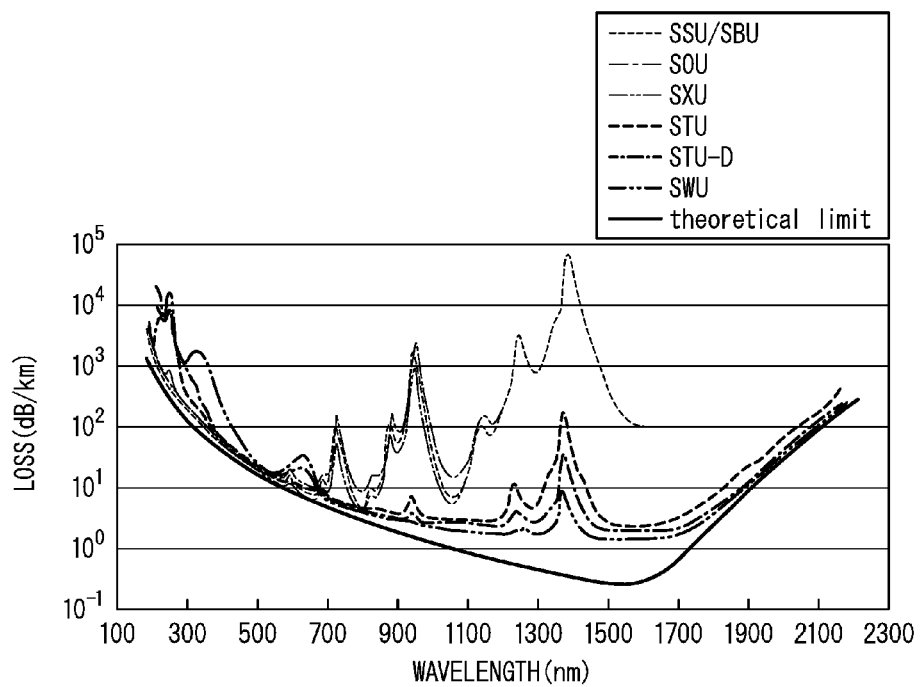
FIG. 6 is a graph showing attenuation characteristics of an optical fiber described in Document 1.
Figure 7:
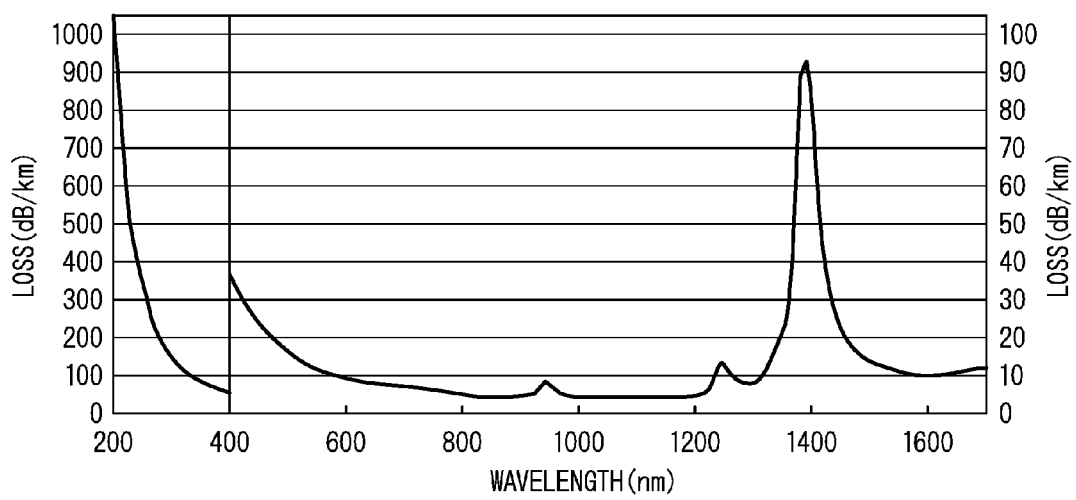
FIG. 7 is a graph showing attenuation characteristics of an optical fiber over wide wavelength range described in Document 2.

Before and after irradiating the ultraviolet light, the transmission loss of the optical fiber of Example 1 is measured in a wavelength range of 300-380 nm. The attenuation characteristics of the optical fiber of Example 1 are shown in FIG. 4.

Comparative Example 5

Similar to Example 5, a deterioration test of the optical fiber of Comparative Example 1 is performed by irradiating ultraviolet light in the optical fiber of Comparative Example 1 using a deuterium lamp.

Before and after irradiating the ultraviolet light, the transmission loss of the optical fiber of Comparative Example 1 is measured in a wavelength range of 300-380 nm. The attenuation characteristics of the optical fiber of Comparative Example 1 are shown in FIG. 4.

From the results shown in FIG. 4, it is confirmed that there are no significant differences regarding the deterioration, which is due to the loss after irradiating the ultraviolet light, of the optical fiber of Example 1 and the optical fiber of Comparative Example 1. In addition, at a wavelength of an i-line such as 315 nm and a wavelength region having wavelengths longer than an i-line, it is confirmed that the optical fiber of Example 1 shows the similar characteristics as core glass where hydroxyl-groups are added.

Example 6

By a VAD method, silica glass particles are deposited on a tip of a starting rod to fabricate soot. The fabricated soot is dehydrated (dried) by heating at 1000° C. under an atmosphere of a chlorine gas and the dehydrated soot is sintered by heating at 1550° C. under an atmosphere of a helium gas, and thereby, a transparent vitric preform is obtained. Thus, the core preform composed of silica glass having the hydroxyl-group concentration of less than or equal to 1 ppm is fabricated.

Furthermore, by a PCVD method, silicon tetrachloride (SiCl$_4$), tetrafluoroethylene (C$_2$F$_4$), and oxygen (O$_2$) are supplied to the inside of the silica glass tube to generate a plasma flame inside the silica glass tube. Glass particles are deposited on the inner surface of the silica glass tube by the heat to be sintered. Thus, the cladding preform composed of the silica glass having the fluorine concentration of 3.2 wt % is fabricated in the silica glass tube.

The core preform and the cladding preform described above are integrated as the same manner described in Example 1.

A portion of the surface of the integrated preform is removed by flame polishing, and the optical fiber preform is obtained.

The obtained optical fiber preform has the relative refractive index difference between the core and the cladding of 0.8%, and an outer diameter of the cladding is 1.42 times with respect to the core diameter. The obtained optical fiber preform is drawn at the drawing speed of 5 m/min, and the optical fiber of Example 6 that has a core diameter of 120 μm, a cladding diameter of 170 μm, and a coating diameter of 190 μm is obtained.

Similar to Example 1, the transmission loss of the obtained optical fiber is measured in a wavelength range of 400-1400 nm. At the wavelength of 400 nm, the transmission loss is 36 dB/km, at the wavelength of 1300 nm, the transmission loss is 2.0 dB/km, at the wavelength of 1380 nm, the transmission loss is 11 dB/km, and the numerical aperture (NA) is 0.18. Although the numerical aperture is small, the optical fiber is usable for a spectroscopic analysis.

The main characteristics of the optical fiber of Example 6 are shown in Table 2.

Example 7

By a VAD method, silica glass particles are deposited on a tip of a starting rod to fabricate soot. The fabricated soot is dehydrated (dried) by heating at 1000° C. under an atmosphere of a chlorine gas and the dehydrated soot is sintered by heating at 1550° C. under an atmosphere of a helium gas, and thereby, a transparent preform is obtained. Thus, the core preform composed of a silica glass having the hydroxyl-group concentration of less than or equal to 1 ppm is fabricated.

Furthermore, by a PCVD method, silicon tetrachloride ($SiCl_4$), tetrafluoroethylene ($C_2F_4$), and oxygen ($O_2$) are supplied to the inside of the silica glass tube to generate a plasma flame inside the silica glass tube. Glass particles are deposited on the inner surface of the silica glass tube by the heat to be sintered. Thus, the cladding preform composed of the silica glass having the fluorine concentration of 7.2 wt % is fabricated in the silica glass tube.

The core preform and the cladding preform described above are integrated as the same manner described in Example 1.

A portion of the surface of the integrated preform is removed by flame polishing, and the optical fiber preform is obtained.

The obtained optical fiber preform has the relative refractive index difference between the core and the cladding of 1.8%, and an outer diameter of the cladding is 1.42 times with respect to the core diameter. In a process of integrating core preform with cladding preform, since the fluorine concentration of the cladding preform is high, several bubbles are generated at an interface of the core and the cladding. The obtained optical fiber preform is drawn at the drawing speed of 5 m/min, and the optical fiber of Example 7 that has a core diameter of 120 μm, a cladding diameter of 170 μm, and a coating diameter of 190 μm is obtained.

Similar to Example 1, the transmission loss of the obtained optical fiber is measured in a wavelength range of 400-1400 nm. At the wavelength of 400 nm, the transmission loss is 36 dB/km, at the wavelength of 1300 nm, the transmission loss is 2.0 dB/km, at the wavelength of 1380 nm, the transmission loss is 11 dB/km, and the numerical aperture (NA) is 0.28.

The main characteristics of the optical fiber of Example 7 are shown in Table 2.

In Example 7, in a process of integrating core preform with cladding preform and a drawing process, the generation of bubbles are confirmed; however, in the end, the optical fiber where 70% of portions of the optical fiber did not have bubbles generated is obtained.

Comparative Example 6

By a VAD method, silica glass particles are deposited on a tip of a starting rod to fabricate soot. The fabricated soot is dehydrated (dried) by heating at 1000° C. under an atmosphere of a chlorine gas and the dehydrated soot is sintered by heating at 1550° C. under an atmosphere of a helium gas, and thereby, a transparent vitric preform is obtained. Thus, the core preform composed of silica glass having the hydroxyl-group concentration of less than or equal to 1 ppm is fabricated.

The fabricated silica glass is used as a core preform, and by an outside vapor-deposition method using soot, glass particles are deposited at an outer surface of the core preform to fabricate soot. Then, the soot is heated at 1380° C. under silicon tetrafluoride ($SiF_4$) atmosphere to sinter the glass particles, and thereby, the preform is sintered. Thus, the optical fiber preform including a core having a hydroxyl-group concentration of less than or equal to 1 ppm and a cladding having the fluorine concentration of 2.8 wt % is obtained.

The obtained optical fiber preform has the relative refractive index difference between the core and the cladding of 0.7%, and an outer diameter of the cladding is 1.42 times with respect to the core diameter. The obtained optical fiber preform is drawn at the drawing speed of 5 m/min, and the optical fiber of Comparative Example 6 that has a core diameter of 120 μm, a cladding diameter of 170 μm, and a coating diameter of 190 μm is obtained.

Similar to Example 1, the transmission loss of the obtained optical fiber is measured in a wavelength range of 400-1400 nm. At the wavelength of 400 nm, the transmission loss is 36 dB/km, at the wavelength of 1300 nm, the transmission loss is 2.0 dB/km, at the wavelength of 1380 nm, the transmission loss is 11 dB/km, and the numerical aperture (NA) is 0.17. As an optical fiber for use in a spectroscopic analysis, the numerical aperture (NA) is not sufficient.

The main characteristics of the optical fiber of Comparative Example 6 are shown in Table 2.

Comparative Example 7

By a VAD method, silica glass particles are deposited on a tip of a starting rod to fabricate soot. The fabricated soot is dehydrated (dried) by heating at 1000° C. under the atmosphere of a chlorine gas and the dehydrated soot is sintered by heating at 1550° C. under an atmosphere of a helium gas, and thereby, a transparent vitric preform is obtained. Thus, silica glass having the hydroxyl-group concentration of less than or equal to 1 ppm is fabricated.

Furthermore, by a PCVD method, silicon tetrachloride ($SiCl_4$), tetrafluoroethylene ($C_2F_4$), and oxygen ($O_2$) are supplied to the inside of the silica glass tube to generate a plasma flame inside the silica glass tube. Glass particles are deposited on the inner surface of the silica glass tube by the heat to be directly sintered. Thus, the cladding preform composed of the silica glass having the fluorine concentration of 8.0 wt % is fabricated in the silica glass tube.

The core preform and the cladding preform described above are integrated as the same manner described in Example 1.

However, in the process of integrating core preform with cladding preform, since the fluorine concentration of the cladding is too high, a large number of bubbles are generated at an interface of the core and the cladding. Therefore, an optical fiber preform is not obtained.

TABLE 2

|  | Example 6 | Example 7 | Comparative Example 6 | Comparative Example 7 |
|---|---|---|---|---|
| Method of fabricating core preform | VAD method | VAD method | VAD method | VAD method |
| Hydroxyl-group concentration of core preform [ppm] | ≤1 | ≤1 | ≤1 | ≤1 |
| Fluorine concentration of cladding [wt %] | 3.2 | 7.2 | 2.8 | 8.0 |
| Refractive index difference of cladding with respect to pure silica glass [%] | 0.8 | 1.8 | 0.7 | 2.0 |
| Refractive index difference between core and cladding [%] | 0.8 | 1.8 | 0.7 | 2.0 |
| Method of integrating core and cladding | Jacket method | Jacket method | Outside vapor-deposition method using soot | Jacket method |
| Core diameter [μm] | 120 | 120 | 120 | 120 |
| Cladding diameter [μm] | 170 | 170 | 170 | 170 |
| Drawing speed [m/min] | 5 | 5 | 5 | — |
| Transmission loss at wavelength of 400 nm [dB/km] | 36 | 36 | 36 | — |
| Transmission loss at wavelength of 1300 nm [dB/km] | 2.0 | 2.0 | 2.0 | — |
| Transmission loss at wavelength of 1380 nm [dB/km] | 11 | 11 | 11 | — |
| NA at wavelength of 630 nm (numerical aperture) | 0.18 | 0.28 | 0.17 | — |

Comparative Example 8

By a VAD method, silica glass particles are deposited on a tip of a starting rod to fabricate soot. The fabricated soot is dehydrated (dried) by heating at 1000° C. under the atmosphere of a chlorine gas and the dehydrated soot is sintered by heating at 1550° C. under an atmosphere of a helium gas, and thereby, a transparent vitric preform is obtained. Thus, the core preform having the hydroxyl-group concentration of less than or equal to 1 ppm is fabricated.

Furthermore, by a PCVD method, silicon tetrachloride ($SiCl_4$), tetrafluoroethylene ($C_2F_4$), and oxygen ($O_2$) are supplied to the inside of the silica glass tube to generate a plasma flame inside the silica glass tube. Glass particles are deposited on the inner surface of the silica glass tube by the heat to be directly sintered. Thus, the cladding preform composed of the silica glass having the fluorine concentration of 5.0 wt % is fabricated in the silica glass tube.

The core preform and the cladding preform described above are integrated as the same manner described in Example 1.

Next, a portion of the surface of the integrated preform is removed by flame polishing, and the optical fiber preform is obtained.

The obtained optical fiber preform has the relative refractive index difference between the core and the cladding of 1.25%, and an outer diameter of the cladding is 1.167 times with respect to the core diameter.

The obtained optical fiber preform is drawn at the drawing speed of 5 m/min, and the optical fiber of Comparative Example 8 that has a core diameter of 120 μm, a cladding diameter of 140 μm, and a coating diameter of 190 μm is obtained.

Similar to Example 1, the transmission loss of the obtained optical fiber is measured in a wavelength range of 400-1400 nm. At the wavelength of 400 nm, the transmission loss is 36 dB/km, at the wavelength of 1300 nm, the transmission loss is 40 dB/km, at the wavelengths of both 1380 nm and 1400 nm, the transmission loss is more than or equal to 100 dB/km, and the numerical aperture (NA) is 0.22.

The main characteristics of the optical fiber of Comparative Example 8 are shown in Table 3.

In the optical fiber of Comparative Example 8, since the thickness of the cladding is thin as 10 μm, the light is leaked and the loss increased sharply from a wavelength of around 1300 nm.

Example 8

By a VAD method, silica glass particles are deposited on a tip of a starting rod to fabricate soot. The fabricated soot is dehydrated (dried) by heating at 1000° C. under the atmosphere of a chlorine gas and the dehydrated soot is sintered by heating at 1550° C. under an atmosphere of a helium gas, and thereby, a transparent preform is obtained. Thus, a core preform composed of silica glass having the hydroxyl-group concentration of less than or equal to 1 ppm is fabricated.

Furthermore, by a PCVD method, silicon tetrachloride ($SiCl_4$), tetrafluoroethylene ($C_2F_4$), and oxygen ($O_2$) are supplied to the inside of the silica glass tube to generate a plasma flame inside the silica glass tube. Glass particles are deposited on the inner surface of the silica glass tube by the heat to be directly sintered. Thus, the cladding preform composed of the silica glass having the fluorine concentration of 5.0 wt % is fabricated in the silica glass tube.

The core preform and the cladding preform described above are integrated as the same manner described in Example 1.

Next, a portion of the surface of the integrated preform is removed by flame polishing, and the optical fiber preform is obtained.

The obtained optical fiber preform has the relative refractive index difference between the core and the cladding of 1.25%, and an outer diameter of the cladding is 1.583 times with respect to the core diameter.

The obtained optical fiber preform is drawn at the drawing speed of 5 m/min, and the optical fiber of Example 8 that has a core diameter of 120 μm, a cladding diameter of 190 μm, and a coating diameter of 210 μm is obtained.

Similar to Example 1, the transmission loss of the obtained optical fiber is measured in a wavelength range of 400-1400 nm. At the wavelength of 400 nm, the transmission loss is 36 dB/km, at the wavelength of 1300 nm, the transmission loss is 2.0 dB/km, at the wavelength of 1380 nm, the transmission loss is 11 dB/km, and the numerical aperture (NA) is 0.22.

The main characteristics of the optical fiber of Example 8 are shown in Table 3.

Comparative Example 9

By a VAD method, silica glass particles are deposited on a tip of a starting rod to fabricate soot. The fabricated soot is dehydrated (dried) by heating at 1000° C. under the atmosphere of a chlorine gas and the dehydrated soot is sintered by heating at 1550° C. under an atmosphere of a helium gas, and thereby, a transparent preform is obtained. Thus, a core preform composed of silica glass having the hydroxyl-group concentration of less than or equal to 1 ppm is fabricated.

Furthermore, by a PCVD method, silicon tetrachloride (SiCl$_4$), tetrafluoroethylene (C$_2$F$_4$), and oxygen (O$_2$) are supplied to the inside of the silica glass tube to generate a plasma flame inside the silica glass tube. Glass particles are deposited on the inner surface of the silica glass tube by the heat to be directly sintered. Thus, the cladding preform composed of the silica glass having the fluorine concentration of 5.0 wt % is fabricated in the silica glass tube.

The core preform and the cladding preform described above are integrated as the same manner described in Example 1.

Next, a portion of the surface of the integrated preform is removed by flame polishing, and the optical fiber preform is obtained.

The obtained optical fiber preform has the relative refractive index difference between the core and the cladding of 1.25%, and an outer diameter of the cladding is 1.125 times with respect to the core diameter.

The obtained optical fiber preform is drawn at the drawing speed of 5 m/min, and the optical fiber of Comparative Example 9 that has a core diameter of 120 μm, a cladding diameter of 135 μm, and a coating diameter of 190 μm is obtained.

Similar to Example 1, the transmission loss of the obtained optical fiber is measured in a wavelength range of 400-1400 nm. At the wavelength of 400 nm, the transmission loss is 36 dB/km, at the wavelength of 1300 nm, the transmission loss is over 100 dB/km, and the numerical aperture (NA) is 0.22.

The main characteristics of the optical fiber of Comparative Example 9 are shown in Table 3.

In the optical fiber of Comparative Example 9, since the thickness of the cladding is thin, the loss increased at a region of longer wavelengths, and at a wavelength of 1300 nm, the transmission loss is greater than 100 dB/km.

TABLE 3

| | Comparative Example 8 | Example 8 | Comparative Example 9 |
|---|---|---|---|
| Method of fabricating core preform | VAD method | VAD method | VAD method |
| Hydroxyl-group concentration of core preform [ppm] | ≤1 | ≤1 | ≤1 |
| Fluorine concentration of cladding [wt %] | 5.0 | 5.0 | 5.0 |
| Refractive index difference of cladding with respect to pure silica glass [%] | 1.25 | 1.25 | 1.25 |
| Refractive index difference between core and cladding [%] | 1.25 | 1.25 | 1.25 |
| Method of integrating core and cladding | Jacket method | Jacket method | Jacket method |
| Core diameter [μm] | 120 | 120 | 120 |
| Cladding diameter [μm] | 140 | 190 | 135 |
| Drawing speed [m/min] | 5 | 5 | 5 |
| Transmission loss at wavelength of 400 nm [dB/km] | 36 | 36 | 36 |
| Transmission loss at wavelength of 1300 nm [dB/km] | 40 | 2.0 | >100 |
| Transmission loss at wavelength of 1380 nm [dB/km] | >100 | 11 | >100 |
| NA at wavelength of 630 nm (numerical aperture) | 0.22 | 0.22 | 0.22 |

Example 9

By a VAD method, silica glass particles are deposited on a tip of a starting rod to fabricate soot. The fabricated soot is dehydrated (dried) by heating at 1000° C. under a chlorine gas atmosphere and the dehydrated soot is sintered by heating at 1500° C. under a helium gas atmosphere including silicon tetrafluoride (SiF$_4$), and thereby, a transparent preform is obtained. Thus, the core preform composed of silica glass having a hydroxyl-group concentration of less than or equal to 1 ppm is fabricated and the fluorine concentration of 0.8 wt %.

Furthermore, by a PCVD method, silicon tetrachloride (SiCl$_4$), tetrafluoroethylene (C$_2$F$_4$), and oxygen (O$_2$) are supplied to the inside of the silica glass tube to generate a plasma flame inside the silica glass tube. Glass particles are deposited on the inner surface of the silica glass tube by the heat to be directly sintered. Thus, the cladding preform composed of the silica glass having the fluorine concentration of 5.0 wt % is fabricated in the silica glass tube.

The core preform and the cladding preform described above are integrated as the same manner described in Example 1.

Next, the silica glass tube is removed by flame polishing, and the optical fiber preform is obtained.

The obtained optical fiber preform has the relative refractive index difference between the core and the cladding of 1.05%, and an outer diameter of the cladding is 1.42 times with respect to the core diameter.

The obtained optical fiber preform is drawn at the drawing speed of 5 m/min, and the optical fiber of Example 9 that has a core diameter of 120 μm, a cladding diameter of 170 μm, and a coating diameter of 190 μm is obtained.

Similar to Example 1, the transmission loss of the obtained optical fiber is measured in a wavelength range of 400-1400 nm. At the wavelength of 400 nm, the transmission loss is 37 dB/km, at the wavelength of 1300 nm, the transmission loss is 2.0 dB/km, at the wavelength of 1380 nm, the transmission loss is 11 dB/km, and the numerical aperture (NA) is 0.21.

The main characteristics of the optical fiber of Example 9 are shown in Table 4.

Example 10

By a VAD method, silica glass particles are deposited on a tip of a starting rod to fabricate soot. The fabricated soot is dehydrated (dried) by heating at 1000° C. under a chlorine gas atmosphere and the dehydrated soot is sintered by heating at 1480° C. under a helium gas atmosphere including silicon tetrafluoride ($SiF_4$), and thereby, a transparent vitric preform is obtained. Thus, the core preform composed of silica glass having the hydroxyl-group concentration of less than or equal to 1 ppm is fabricated and the fluorine concentration of 1.2 wt %.

Furthermore, by a PCVD method, silicon tetrachloride ($SiCl_4$), tetrafluoroethylene ($C_2F_4$), and oxygen ($O_2$) are supplied to the inside of the silica glass tube to generate a plasma flame inside the silica glass tube. Glass particles are deposited on the inner surface of the silica glass tube by the heat to be directly sintered. Thus, the cladding preform composed of the silica glass having the fluorine concentration of 5.0 wt % is fabricated in the silica glass tube.

The core preform and the cladding preform described above are integrated as the same manner described in Example 1.

Next, the silica glass tube is removed by flame polishing, and the optical fiber preform is obtained.

The obtained optical fiber preform has the relative refractive index difference between the core and the cladding of 0.95%, and an outer diameter of the cladding is 1.42 times with respect to the core diameter.

The obtained optical fiber preform is drawn at the drawing speed of 5 m/min, and the optical fiber of Example 10 that has a core diameter of 120 μm, a cladding diameter of 170 μm, and a coating diameter of 190 μm is obtained.

Similar to Example 1, the transmission loss of the obtained optical fiber is measured in a wavelength range of 400-1400 nm. At the wavelength of 400 nm, the transmission loss is 38 dB/km, at the wavelength of 1300 nm, the transmission loss is 4 dB/km, at the wavelength of 1380 nm, the transmission loss is 20 dB/km, and the numerical aperture (NA) is 0.20.

The main characteristics of the optical fiber of Example 10 are shown in Table 4.

Example 11

By a VAD method, silica glass particles are deposited on a tip of a starting rod to fabricate soot. The fabricated soot is dehydrated (dried) by heating at 1000° C. under a chlorine gas atmosphere and the dehydrated soot is sintered by heating at 1460° C. under a helium gas atmosphere including silicon tetrafluoride ($SiF_4$), and thereby, a transparent preform is obtained. Thus, the core preform composed of silica glass having the hydroxyl-group concentration of less than or equal to 1 ppm is fabricated and the fluorine concentration of 1.6 wt %.

Furthermore, by a PCVD method, silicon tetrachloride ($SiCl_4$), tetrafluoroethylene ($C_2F_4$), and oxygen ($O_2$) are supplied to the inside of the silica glass tube to generate a plasma flame inside the silica glass tube. Glass particles are deposited on the inner surface of the silica glass tube by the heat to be directly sintered. Thus, the cladding preform composed of the silica glass having the fluorine concentration of 5.0 wt % is fabricated in the silica glass tube.

The core preform and the cladding preform described above are integrated as the same manner described in Example 1.

Next, the silica glass tube is removed by flame polishing, and the optical fiber preform is obtained.

The obtained optical fiber preform has the relative refractive index difference between the core and the cladding of 0.85%, and an outer diameter of the cladding is 1.42 times with respect to the core diameter.

The obtained optical fiber preform is drawn at the drawing speed of 5 m/min, and the optical fiber of Example 11 that has a core diameter of 120 μm, a cladding diameter of 170 μm, and a coating diameter of 190 μm is obtained.

Similar to Example 1, the transmission loss of the obtained optical fiber is measured in a wavelength range of 400-1400 nm. At the wavelength of 400 nm, the transmission loss is 40 dB/km, at the wavelength of 1300 nm, the transmission loss is 10 dB/km, at the wavelength of 1380 nm, the transmission loss is 40 dB/km, and the numerical aperture (NA) is 0.19.

The main characteristics of the optical fiber of Example 11 are shown in Table 4.

TABLE 4

|  | Example 9 | Example 10 | Example 11 |
|---|---|---|---|
| Method of fabricating core preform | VAD method | VAD method | VAD method |
| Hydroxyl-group concentration of core preform [ppm] | ≤1 | ≤1 | ≤1 |
| Fluorine concentration of core [wt %] | 0.8 | 1.2 | 1.6 |
| Refractive index difference of core with respect to pure silica glass [%] | 0.2 | 0.3 | 0.4 |
| Fluorine concentration of cladding [wt %] | 5.0 | 5.0 | 5.0 |
| Refractive index difference of cladding with respect to pure silica glass [%] | 1.25 | 1.25 | 1.25 |
| Refractive index difference between core and cladding [%] | 1.05 | 0.95 | 0.85 |
| Method of integrating core and cladding | Jacket method | Jacket method | Jacket method |
| Core diameter [μm] | 120 | 120 | 120 |
| Cladding diameter [μm] | 170 | 170 | 170 |
| Drawing speed [m/min] | 5 | 5 | 5 |
| Transmission loss at wavelength of 400 nm [dB/km] | 37 | 38 | 40 |
| Transmission loss at wavelength of 1300 nm [dB/km] | 2.0 | 4 | 10 |
| Transmission loss at wavelength of 1380 nm [dB/km] | 11 | 20 | 40 |
| NA at wavelength of 630 nm (numerical aperture) | 0.21 | 0.20 | 0.19 |

In the optical fibers of Examples 9-11 where fluorine is added to the cores, slight increases of the loss are confirmed at each wavelength of 400 nm, 1300 nm, and 1380 nm. However, similar to Example 4, when deterioration tests of the optical fibers of Examples 9-11 are performed by irradiating ultraviolet light in the optical fibers of Examples 9-11 using an excimer laser, deterioration characteristics are improved. In addition, the optical fibers of Examples 9-11, NA (Numerical Aperture) decreases in accordance with the additive amount of fluorine added to the core; however, the optical fibers are usable depending on the use.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A low-loss optical fiber over wide wavelength range comprising a transmission loss of less than or equal to 40 dB/km in a whole wavelength range of 400-1400 nm, and
being manufactured by drawing an optical fiber preform comprising a core composed of a silica glass having a hydroxyl-group concentration of less than or equal to 1 ppm and a cladding composed of a silica glass having a fluorine concentration of more than or equal to 3.2 wt %.

2. The low-loss optical fiber over wide wavelength range according to claim 1, wherein the fluorine concentration is less than or equal to 7.2 wt %.

3. The low-loss optical fiber over wide wavelength range according to claim 1, wherein a transmission loss at a wavelength of 400 nm is less than or equal to 40 dB/km, a transmission loss at a wavelength of 1300 nm is less than or equal to 10 dB/km, and a maximum transmission loss in wavelengths of 1300-1400 nm is less than or equal to 40 dB/km.

4. The low-loss optical fiber over wide wavelength range according to claim 2, wherein a transmission loss at a wavelength of 400 nm is less than or equal to 40 dB/km, a transmission loss at a wavelength of 1300 nm is less than or equal to 10 dB/km, and a maximum transmission loss in wavelengths of 1300-1400 nm is less than or equal to 40 dB/km.

5. The low-loss optical fiber over wide wavelength range according to claim 1, wherein the optical fiber preform is composed by integrating a core preform which forms the core with a cladding preform which forms the cladding and is composed on an inner surface of a silica glass tube, and the optical fiber preform is drawn at a drawing speed of less than or equal to 10 m/min.

6. The low-loss optical fiber over wide wavelength range according to claim 1, wherein the optical fiber preform is composed by integrating a core preform which forms the core with a cladding preform which forms the cladding and is composed on an inner surface of a silica glass tube, and the optical fiber preform is drawn by the drawing speed of less than or equal to 10 m/min, and a transmission loss at a wavelength of 1300 nm is less than or equal to 10 dB/km, and a maximum transmission loss in wavelengths of 1300-1400 nm is less than or equal to 40 dB/km.

7. The low-loss optical fiber over wide wavelength range according to claim 5, wherein the drawing speed is less than or equal to 5 m/min.

8. The low-loss optical fiber over wide wavelength range according to claim 6, wherein the drawing speed is less than or equal to 5 m/min.

9. The low-loss optical fiber over wide wavelength range according to claim 1, wherein a fluorine concentration of the core is 0.8-1.6 wt %.

10. A method of manufacturing a low-loss optical fiber over wide wavelength range comprising:
fabricating a core preform composed of a silica glass having a hydroxyl-group concentration of less than or equal to 1 ppm;
fabricating a cladding preform on an inner surface of a silica glass tube, the cladding being composed of a silica glass having a fluorine concentration of more than or equal to 3.2 wt %;
grinding a surface of the core preform and an inner surface of the cladding preform by etching;
fabricating an optical fiber preform by integrating the core preform with the cladding preform;
drawing the optical fiber preform at a drawing speed of less than or equal to 10 m/min; and
manufacturing a low-loss optical fiber over wide wavelength range comprising a transmission loss of less than or equal to 40 dB/km in a whole wavelength range of 400-1400 nm and a transmission loss of less than or equal to 10 dB/km at a wavelength of 1300 nm.

11. The method of manufacturing a low-loss optical fiber over wide wavelength range according to claim 10, wherein a maximum transmission loss is less than or equal to 40 dB/km in a wavelength range of 1300-1400 nm.

12. The method of manufacturing a low-loss optical fiber over wide wavelength range according to claim 10, wherein the drawing speed is less than or equal to 5 m/min.

* * * * *